(12) United States Patent
Claesson et al.

(10) Patent No.: US 11,993,330 B2
(45) Date of Patent: May 28, 2024

(54) METHOD FOR CONTROLLING PHYSICALLY CONNECTING A FIRST AND A SECOND MODULE TO ASSEMBLE A VEHICLE, A CONTROL DEVICE, A VEHICLE, A SYSTEM, A COMPUTER PROGRAM AND A COMPUTER-READABLE MEDIUM

(71) Applicant: Scania CV AB, Södertälje (SE)

(72) Inventors: André Claesson, Tullinge (SE); Morgan Colling, Hölö (SE); Nils Åkerman, Årsta (SE); Robert Sjödin, Nyköping (SE); Linus Ährlig, Västerhaninge (SE); Mikko Kallio, Hölö (SE); Sami Teppola, Nykvarn (SE); Tomas Skeppström, Södertälje (SE)

(73) Assignee: Scania CV AB, Södertälje (SE)

( * ) Notice: Subject to any disclaimer, the term of this patent is extended or adjusted under 35 U.S.C. 154(b) by 741 days.

(21) Appl. No.: 17/254,371

(22) PCT Filed: Jun. 14, 2019

(86) PCT No.: PCT/SE2019/050565
§ 371 (c)(1),
(2) Date: Dec. 21, 2020

(87) PCT Pub. No.: WO2020/005136
PCT Pub. Date: Jan. 2, 2020

(65) Prior Publication Data
US 2021/0269109 A1 Sep. 2, 2021

(30) Foreign Application Priority Data
Jun. 29, 2018 (SE) .................................. 1850807-7

(51) Int. Cl.
B62D 65/04 (2006.01)
B62D 27/00 (2006.01)
(Continued)

(52) U.S. Cl.
CPC ............. *B62D 65/04* (2013.01); *B62D 27/00* (2013.01); *B62D 63/025* (2013.01);
(Continued)

(58) Field of Classification Search
CPC ...... B62D 65/04; B62D 27/00; B62D 63/025; B62D 65/024; G01S 13/08; G01S 19/01; G05B 19/042; G05D 1/021
(Continued)

(56) References Cited

U.S. PATENT DOCUMENTS 5,934,397 A * 8/1999 Schaper ............... B62D 63/025
180/65.245
6,059,058 A * 5/2000 Dower .................... B60L 50/52
180/65.265
(Continued)

FOREIGN PATENT DOCUMENTS

CH 699320 A2 2/2010
DE 102016209099 A1 7/2017
(Continued)

OTHER PUBLICATIONS

Jahn, M., et al., Concept of Actuation and Control for the EO Smart Connecting Car (EO scc), ICIRA 2012, Part I, LNAI 7506, 2012, pp. 87-98.
(Continued)

*Primary Examiner* — Yazan A Soofi
(74) *Attorney, Agent, or Firm* — Moore & Van Allen PLLC; W. Kevin Ransom

(57) ABSTRACT

The invention relates to a method, performed by a first control device, for controlling physically connecting a first
(Continued)

and a second module to assemble a vehicle, wherein the first control device is comprised in the first module, the method comprising: activating a sensor device in the first module; identifying an area between the two modules by means of the sensor device; transmitting information about the identified area to the second module; continuously determining the position of the second module in relation to the first module, by means of the sensor device, while the second module is moving towards the first module, and transmitting the determined position to the second module; and physically connecting the modules when the second module has reached the first module.

24 Claims, 7 Drawing Sheets

(51) Int. Cl.
  *B62D 63/02* (2006.01)
  *B62D 65/02* (2006.01)
  *G01S 13/08* (2006.01)
  *G01S 19/01* (2010.01)
  *G05B 19/042* (2006.01)
  *G05D 1/00* (2006.01)

(52) U.S. Cl.
  CPC ............ *B62D 65/024* (2013.01); *G01S 13/08* (2013.01); *G01S 19/01* (2013.01); *G05B 19/042* (2013.01); *G05D 1/021* (2013.01); *G05B 2219/2637* (2013.01)

(58) Field of Classification Search
  USPC .......................................................... 701/23
  See application file for complete search history.

(56) References Cited

U.S. PATENT DOCUMENTS

| | | |
|---|---|---|
| 9,802,661 B1 | 10/2017 | Kentley-Klay |
| 2012/0193153 A1* | 8/2012 | Wellborn ............... B60W 10/08 180/14.2 |
| 2015/0217819 A1* | 8/2015 | Pojidaev ............... B62D 63/025 180/9.42 |
| 2016/0129958 A1* | 5/2016 | Byrnes .................... B60L 15/32 180/12 |
| 2017/0203801 A1* | 7/2017 | Hung ..................... B62D 61/12 |
| 2018/0039285 A1 | 2/2018 | Giegel |
| 2018/0050626 A1* | 2/2018 | Delp ....................... B60L 50/60 |
| 2018/0157270 A1 | 6/2018 | Kasper et al. |
| 2018/0345971 A1* | 12/2018 | Birnschein ......... B60H 1/00642 |
| 2022/0043460 A1* | 2/2022 | Claesson ................. H04W 4/40 |

FOREIGN PATENT DOCUMENTS

| | | |
|---|---|---|
| DE | 102018002229 A1 | 8/2018 |
| DE | 102017216207 A1 | 10/2018 |
| WO | 2005095192 A1 | 10/2005 |
| WO | 2014007729 A1 | 1/2014 |
| WO | 2018222375 A1 | 12/2018 |

OTHER PUBLICATIONS

Scania CV AB, International Application No. PCT/SE2019/050565, International Search Report, dated Aug. 26, 2019.
Scania CV AB, International Application No. PCT/SE2019/050565, Written Opinion, dated Aug. 26, 2019.
Scania CV AB, Swedish Application No. 1850807-7, Office Action, dated Nov. 29, 2018.
Scania CV AB, International Application No. PCT/SE2019/050565, International Preliminary Report on Patentability, dated Dec. 29, 2020.
Scania CV AB, European Patent Application No. 19826307.1, Extended European Search Report, dated Feb. 17, 2022.

* cited by examiner

METHOD FOR CONTROLLING
PHYSICALLY CONNECTING A FIRST AND A
SECOND MODULE TO ASSEMBLE A
VEHICLE, A CONTROL DEVICE, A
VEHICLE, A SYSTEM, A COMPUTER
PROGRAM AND A COMPUTER-READABLE
MEDIUM

CROSS-REFERENCE TO RELATED
APPLICATIONS

This application is a National Stage Application (filed under 35 § U.S.C. 371) of PCT/SE2019/050565, filed Jun. 14, 2019 of the same title, which, in turn claims priority to Swedish Application No. 1850807-7 filed Jun. 29, 2018 of the same title; the contents of each of which are hereby incorporated by reference.

FIELD OF THE INVENTION

The present invention relates to a method for controlling physically connecting a first and a second module to assemble a vehicle. The present invention also relates to a first control device for controlling physically connecting a first and a second module to assemble a vehicle, a second control device for controlling physically connecting a first and a second module to assemble a vehicle, a vehicle, being assembled from a set of modules, a system for controlling physically connecting a first and a second module to assemble a vehicle, a computer program and a computer-readable medium.

BACKGROUND OF THE INVENTION

Vehicles of today are typically manufactured for a specific purpose, e.g. a bus is manufactured for transporting people and a truck is manufactured for transporting goods. Such vehicles are typically manufactured and completely assembled in a factory or they may be partly assembled in a factory and completed at a body manufacturer. Once the vehicle is assembled, the vehicle will only be used for the specific purpose. Thus, a bus will only be used as a bus and a garbage truck will only be used as a garbage truck. Different vehicles are thus needed for different purposes, which may require a large fleet of vehicles and which may be very costly. A more flexible vehicle which enables customization may therefore be desired.

There are, for example, known solutions where a truck can be rebuilt by changing a concrete mixer to a loading platform. This increases the flexibility and two different functions can be achieved by means of one single vehicle. Also, document US-2016/0129958 A discloses a modular electric vehicle using interchangeable vehicle assembly modules. The user can thereby disassemble and reassemble the vehicle for use in different applications. Disassembling and reassembling such a vehicle would, however, be very cumbersome and time consuming.

SUMMARY OF THE INVENTION

Despite known solutions in the field, it would be desirable to achieve a flexible vehicle, which solves or at least alleviates at least some of the drawbacks of the prior art. An object of the present invention is therefore to achieve a new and advantageous method for controlling physically connecting a first and a second module to assemble a vehicle, which method is easier and less time consuming than prior art solutions. Another object of the invention is to achieve a new and advantageous control device, system, computer program and computer-readable medium for controlling physically connecting a first and a second module to assemble a vehicle in an easier and less time consuming way.

The herein mentioned objects are achieved by a method for controlling physically connecting a first and a second module to assemble a vehicle, a first control device, a second control device, a vehicle, a system, a computer program and a computer-readable medium according to the independent claims.

Hence, according to an aspect of the present invention a method performed by a first control device for physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, wherein the first control device is comprised in the first module, the method comprising: activating a sensor device in the first module; identifying an area between the two modules by means of the sensor device; transmitting information about the identified area to the second module; continuously determining the position of the second module in relation to the first module, by means of the sensor device, while the second module is moving towards the first module, and transmitting the determined position to the second module; and physically connecting the modules when the second module has reached the first module.

According to another aspect of the invention a first control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, and wherein the first control device is comprised in a first module of the two modules, the first control device being configured to: activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; and connect the modules when the second module has reached the first module.

According to a further aspect of the invention a method performed by a second control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, wherein the second control device is comprised in the second module, the method comprising: receiving information from the first module about an identified area between the two modules; controlling the second module towards the first module based on the received information about the area between the two modules; continuously receiving information from the first module about the position of the second module in relation to the first module and controlling the second module based on this information; and physically connecting the modules when the second module has reached the first module.

According to another aspect of the invention a second control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, and wherein the second control device is comprised in a second module of the two modules, the second control device being configured to: receive information from the first module about an identified area between the two modules; control the second module towards the first module based on the received information about the area between the two modules; continuously receive information from the first module about the position of the second module in relation to the first module and control the second module based on this information; and physically connect the modules when the second module has reached the first module.

According to another aspect of the invention a vehicle, being assembled from a set of modules is provided, comprising: at least one drive module and; at least one functional module, wherein the at least one drive module comprises a pair of wheels and is configured to be autonomously operated and drive the assembled vehicle, the vehicle comprising: a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

According to another aspect of the invention a system for controlling physically connecting two modules of a vehicle is provided, the vehicle being assembled from a set of modules comprising at least one drive module and; at least one functional module, wherein the at least one drive module comprises a pair of wheels and is configured to be autonomously operated and drive the assembled vehicle, the system comprising: a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

Assembling a vehicle from a set of modules makes it possible to dynamically assemble a vehicle depending on a current mission or function to be performed. This way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. The autonomously operated drive module receives a command from the first control device to physically connect with the at least one functional module. The second control device of the drive module subsequently controls the drive module to execute the command. This means that the drive module receives the command and autonomously/automatically performs the physical connection with the at least one functional module. This way, no manual work is required and the assembly of the vehicle is less cumbersome and much more time efficient. Since the assembly is performed autonomously and thereby is easier and quicker, assembly and disassembly of a vehicle may be performed more frequently. Furthermore, in the event of errors, damages or breakage, the malfunctioning module can easily be removed from the vehicle and be repaired/fixed. The vehicle off road (VOR) time will thereby be reduced and the utilization of the vehicle will increase.

By activating a sensor device in the first module the area between the two modules may be identified. The area between the modules need to be free from obstacles before physically connecting the modules. Such obstacles may for example be other vehicles, human beings and animals. The sensor device may identify such obstacles. The second module is informed about the situation in the area between the modules. If there is an obstacle in the area, the modules will wait to physically connect until the obstacle has been removed. The sensor device also determine the position of the second module and transmits that information to the second module. When the second module has reached the first module, the two modules are physically connected.

Further objects, advantages and novel features of the present invention will become apparent to one skilled in the art from the following details, and also by putting the invention into practice. Whereas embodiments of the invention are described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE INVENTION

Figure 1:
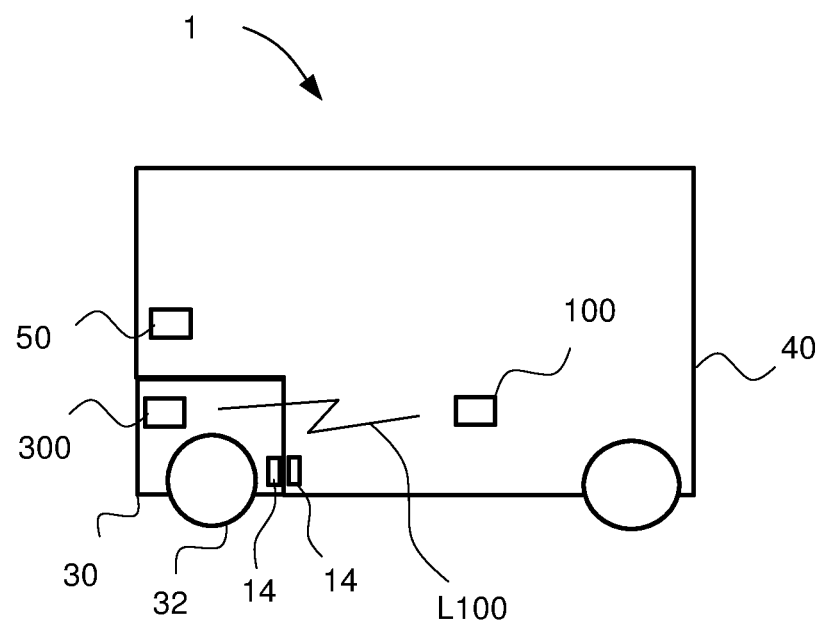
FIG. 1 schematically illustrates a first control device and a second control device for controlling physically connecting a first and a second module to assemble a vehicle according to an embodiment.

To be able to meet customers' different vehicle needs in a flexible and cost efficient way a method for achieving a modularised vehicle has been developed. A modularised vehicle according to the present disclosure is typically assembled at the customer's premises and the customer may thus buy a set of modules from a manufacturer. The present disclosure is applicable on all sorts of road vehicles. However, the disclosure may relate to heavy vehicles, such as buses, trucks etc. Specifically, the present disclosure may relate to vehicles for use on public roads.

According to an aspect of the present disclosure, a method performed by a first control device for physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, wherein the first control device is comprised in the first module, the method comprising: activating a sensor device in the first module; identifying an area between the two modules by means of the sensor device; transmitting information about the identified area to the second module; continuously determining the position of the second module in relation to the first module, by means of the sensor device, while the second module is moving towards the first module, and transmitting the determined position to the second module; and physically connecting the modules when the second module has reached the first module.

By activating a sensor device in the first module the area between the two modules may be identified. The area between the modules need to be free from obstacles before physically connecting the modules. Such obstacles may for example be other vehicles, human beings or animals. The sensor device may identify such obstacles. The second module is informed about the situation in the area between the modules. If there is an obstacle in the area, the modules will wait to physically connect until the obstacle has moved or has been removed. The sensor device also determine the position of the second module and transmits that information to the second module. When the second module has reached the first module, the two modules are physically connected. A new and advantageous method for controlling physically connecting a first and a second module to assemble a vehicle is achieved, which method is easier and less time consuming than prior art solutions. If the first control device is arranged in the functional module and the functional module is adapted to receive two drive modules, the first control device may command two drive modules to connect with the functional module.

There may be identical drive modules or the drive modules may for example have different types/sizes of wheels. In one example the drive module comprises a body provided with a pair of wheels arranged on two opposite sides of the drive module. In an example, the drive module comprises only one pair of wheels. The drive module comprises at least one propulsion unit connected to the pair of wheels. The propulsion unit may be an electric machine, connected to the wheels. The pair of wheels of the drive module may thus be referred to as drive wheels. In one example, the drive module comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surrounding of the drive module. The drive module may be referred to as an autonomously operated vehicle in the sense that it is allowed to operate on public roads.

The at least one functional module is configured to perform a predetermined function while being part of an assembled vehicle. In one example, the functional module may be configured to accommodate or support a load. The at least one functional module may be configured for accommodating passengers and may thus function as a bus when being assembled with at least one drive module. The at least one functional module may alternatively be configured for transporting goods and may thus function as a truck when being assembled with at least one drive module. The at least one functional module may be any of a garbage truck body, a loading platform, a fork arrangement for a forklift, and a snowplough. The functional module may comprise trailing wheels which are not driven or steerable. A functional module cannot move on its own but needs to be connected to at least one drive module to be able to move and thereby function as a vehicle. The functional module may comprise an energy storage unit.

According to an example the functional module may comprise a control device, referred to as the first control device. The drive module may comprise a control device, referred to as the second control device. The first and second control devices are adapted to communicate directly with each other or may be adapted to communicate with each other in a network, together with other components.

The sensor device may be arranged at the drive module and/or the functional module. The sensor device may be configured to identifying the area between the two modules before and/or during the physically connecting of the modules. The sensor device may also be configured to continuously determining the position of the second module in relation to the first module. The sensor device may also be configured to sense if the first and second modules have been correctly connected physically.

When the drive module and the functional module have been electrically connected, there may be a handshake between the modules. The sensor device verifying the physical connection as mentioned above may also be configured to sense when the electrical connection is performed. Alternatively, the drive module and/or the functional module comprises another sensor for sensing when the electrical connection is performed. The received verification of the connection between the modules may thus comprise a verification of the physical connection and/or the electrical connection.

The step of transmitting information about the identified area to the second module and transmitting the determined position to the second module are performed via 4G, 5G, V2I, Wi-Fi, Bluetooth or any other wireless communication means. The modules may communicate directly with each other via 4G, 5G, V2I (Vehicle to Infrastructure), Wi-Fi, Bluetooth or any other wireless communication means. Thus, transmitting information about the identified area between the two modules and the determined position to the second module for the physically connecting of the modules may be performed directly and symbiotically between the modules without instructions from an off-board center. Alternatively, or in combination with the directly communication between the modules, information about the identified area between the two modules and the determined position to the second module may be transmitted via an off-board center, such as a control center.

The step of physically connecting the modules, when the second module has reached the first module, is performed by a mechanical interface.

The drive module and the functional module each suitably comprises at least one physical interface for the purpose of physically connecting the modules. Such physical interfaces may be configured in different ways, and may for example comprise coupling units adapted to engage, quick couplings, hooks, cooperating protrusions and recesses or similar. The drive module may comprise a physical interface for connection with a functional module on at least two different sides of the drive module. This way, the drive module can be connected to a functional module in various ways and the flexibility is increased. According to an example, the drive module comprises a physical interface both on a front side of the drive module and on a rear side of the drive module. The same drive module can thereby be connected to a front section of a functional module and to a rear section of a functional module, without having to turn the drive module. Additionally or alternatively, the drive module may comprise a physical interface on a top side of the drive module. The different physical interfaces for connection with a functional module may be identical on all sides of the drive module. The physical interfaces of the drive module are adapted for connection with a functional module and/or another drive module. By using a standard interface, which can be used for connection with another drive module as well as a functional module, the flexibility of the drive module increases and the assembly of a vehicle is facilitated.

The step of transmitting information about the identified area to the second module also comprises transmitting the information to a control center arranged in communication with the modules.

The control center or an off-board system may comprise a control device, referred to as a third control device. The first, second and third control devices are adapted to communicate with each other or together as a network. The third control device may be adapted to receive the information about the identified area in order to prepare for physically connection of the modules. If also the control center is informed about the identified area between the modules redundancy is achieved.

The step of transmitting information about the position of the second module also comprises transmitting the information to a control center arranged in communication with the modules.

The third control device at the control center may be adapted to receive information about the position of the second module in order to prepare for physically connection of the modules. If also the control center is informed about the position of the second module redundancy is achieved.

The step of activation of a sensor device is performed in response to receiving an instruction from a control center arranged in communication with the modules.

The control center or off-board system may be provided with a third control device. The control center may be geographically on a distance from the modules. The control center may be adapted to receive information about missions or functions to be performed by the assembled vehicle and based on this mission/function initiate the assembly of the vehicle. The third control device of the control center may be adapted to receive this information from an operator via a user interface. In order to controlling physically connecting of the modules to assemble the vehicle, the activation of the sensor device is performed in response to receiving an instruction from a control center.

The method may further comprise receiving information from the control center, the information indicating which module of the vehicle to operate as a master and which module to operate as a slave.

The module operating as a master will decide how to operate the modules operating as slaves. Typically, a drive module of the vehicle is appointed to operate as a master, and any other drive modules and the functional module will thereby be operating as slaves. The master drive module will thereby decide how to operate the slave drive module(s) and the functional module and thus how to operate the assembled vehicle. In the event that the control device is comprised in a master module, the other modules of the vehicle may comprise control units arranged in communication with the control device. Receiving data from the modules thus means that control units of the modules transmit data to the control device of the master module. The control center may appoint which module to operate as a master and which to operate as slave(s) when assembling the vehicle. The control center may appoint the module to operate as master for example based on the state of charge of the energy storage units of the modules and/or the main travel direction of the assembled vehicle. According to another example, the assembled vehicle itself determines which module to operate as a master and which module(s) to operate as slave(s). When the control device is comprised in a module operating as a master, the control device may be configured to transmit control signals to the various systems and components of the modules of the vehicle for controlling for example the steering and the propulsion of the vehicle. The control device may thereby be adapted to operate the modules autonomously based on received commands, e.g. from the control center, and based on sensor input regarding its surroundings and positioning. The control device is in that case adapted to receive commands from a remotely located control center and to convert the command into control signals for controlling the various systems and components of the modules.

The present disclosure also relates to a computer program comprising instructions, which when the program is executed by a computer, cause the computer to carry out the method described above. The invention further relates to a computer-readable medium comprising instructions, which when executed by a computer causes the computer to carry out the method described above.

The present disclosure also relates to a first control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, and wherein the first control device is comprised in a first module of the two modules, the first control device being configured to: activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; and connect the modules when the second module has reached the first module.

The first control device is comprised in a first module and is configured to activate the sensor device in the first module when the first and second modules should be physically connected to the shape of an assembled vehicle. The sensor device in the first module is configured identify obstacles that may be present between the modules before physically connecting the modules. Such obstacles may for example be other vehicles, human beings or animals.

The first control device receives information from the sensor device and the first control device is configured to transmit the information about the situation in the area between the modules to the second module. The first control device is also configured, by means of the sensor device, to determine the position of the second module. The first control device is configured to transmit the information about the position of the second module to the second module. The position of the first module has been determined by the first control device. The position of the first module may be stored in the first control device. The first control device is configured to physically connect the two modules when the second module has reached the first module. If the first control device is arranged in the functional module and the functional module is adapted to receive two drive modules, the first control device may command two drive modules to connect with the functional module.

A second control device in the second module may be arranged in communication with the first control device and may thereby receive a signal from the sensor device corresponding to the identifying of the area between the two modules and corresponding to the continuously determining the position of the second module in relation to the first module. The second control device may also receive a signal from the first control device indicating that the connection was successfully performed.

The physically connection of the modules may comprise that the modules are mechanically connected with each other by means of a mechanical interface. However, the physically connection of the modules may also comprise that the modules are electrically connected with each other. The at least one drive module and the at least one functional module may each comprise at least one electrical interface for the purpose of connecting the modules electrically. Such an electrical interface may be configured to transfer electric energy and/or to transmit and/or receive electric signals. The electrical interface may be a wireless interface or a conductive interface. By connecting the drive module and the functional module electrically, the modules may transfer electric energy between each other and also share information. The mechanical interface and the electrical interface may be integrated in the same interface.

It will be appreciated that all the embodiments described for the method aspect of the invention performed by the first control device are also applicable to the first control device aspect of the invention. That is, the first control device may be configured to perform any one of the steps of the method according to the various embodiments described above.

The first control device may be implemented as a separate entity or distributed in two or more physical entities. The first control device may comprise one or more computers. The first control device may thus be implemented or realized by the first control device comprising a processor and a memory, the memory comprising instructions, which when executed by the processor causes the first control device to perform the herein disclosed method.

According to an example, the first control device may further be configured to transmit information about the identified area and the determined position to the second module via 4G, 5G, V2I, Wi-Fi, Bluetooth or any other wireless communication means.

Information about the identified area between the two modules and the determined position to the second module are transmitted directly and symbiotically between the modules without instructions from an off-board center. Instead, the first control device is configured to wireless transmit information about the identified area and the determined position to the second module. The information about the identified area and the determined position to the second module may be transmitted to a second control device in the second module. Alternatively, or in combination with the directly communication between the modules, the first control device may be configured to transmit the information about the identified area between the two modules and the determined position to the second module via an off-board center, such as a control center.

According to an example, the first control device may further be configured to physically connecting the modules by a mechanical interface when the second module has reached the first module.

The drive module and the functional module each suitably comprises at least one physical interface for the purpose of physically connecting the modules. Such physical interfaces may be configured in different ways. The physical interface may be a mechanical interface, which may comprise coupling units adapted to engage, quick couplings, hooks, cooperating protrusions and recesses or similar. The physical interface may be a magnetic interface, which connects the modules by means of magnetic force. The drive module may comprise a physical interface for connection with a functional module on at least two different sides of the drive module. This way, the drive module can be connected to a functional module in various ways and the flexibility is increased. According to an example, the drive module comprises a physical interface both on a front side of the drive module and on a rear side of the drive module. The same drive module can thereby be connected to a front section of a functional module and to a rear section of a functional module, without having to turn the drive module. Additionally or alternatively, the drive module may comprise a physical interface on a top side of the drive module. The different physical interfaces for connection with a functional module may be identical on all sides of the drive module. The physical interfaces of the drive module are adapted for connection with a functional module and/or another drive module. By using a standard interface, which can be used for connection with another drive module as well as a functional module, the flexibility of the drive module increases and the assembly of a vehicle is facilitated. The first control device may be configured to control the mechanical interface in order to connect the two modules physically when the second module has reached the first module. The first control device may be configured to control the mechanical interfaces on both modules in order to connect the two modules physically when the second module has reached the first module. The first control device may be configured to instruct a second control device in the second module to connect the two modules physically when the second module has reached the first module. The physical interface may also comprise an electrically interface. The mechanical interface and the electrical interface may be integrated in the same interface. When the modules are physically connected, the modules will be both mechanically connected and electrically connected by means of the same, integrated interface.

The present disclosure further relates to a method performed by a second control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, wherein the second control device is comprised in the second module, the method comprising: receiving information from the first module about an identified area between the two modules; controlling the second module towards the first module based on the received information about the area between the two modules; continuously receiving information from the first module about the position of the second module in relation to the first module and controlling the second module based on this information; and physically connecting the modules when the second module has reached the first module.

The second control device in the second module is commanded to connect physically with the at least one first module and the second control device subsequently executes the command by controlling the at least one first module to physically connect with the at least one second module. The at least one second module is physically connected with the at least one first module through their corresponding interfaces. By the method according to this example the second module performs the connection with the at least one first module, and thus the assembly of the vehicle, autonomously/automatically. When the second control device has received the command, the second control device may accept the command and prepare for the connection. An acceptance of the command may be transmitted to the first control device. The second control device may subsequently control the first module to connect physically with the second module. The first module may receive the command and prepare for the physical connection. A sensor device may be arranged at the first module and/or the second module for determining when the first module and the second module have been physically connected. The second control device of the second module may be arranged in communication with the sensor device. The method may thus comprise activating the sensor device in the first and/or the second module.

The first module may be a functional module. The second module may be a drive module. Controlling the at least one drive module to physically connect with the at least one functional module may comprise controlling the propulsion and the steering of the drive module, such that the drive module is moved to the functional module to connect with. Controlling the at least one drive module to physically connect with the at least one functional module may also comprise identifying the location of the functional module to connect with. Controlling the at least one drive module to physically connect with the at least one functional module may further comprise controlling the physical interface of the drive module, such that it connects with the corresponding physical interface of the functional module.

The step of receiving information from the first module about an identified area between the two modules comprises that the second control device in the second module receives information from the first module about an identified area between the two modules. The first control device may have achieved the information about the identified area between the two modules from a sensor device arranged at the first and/or the second control device.

The step of receiving information from the first module about an identified area between the two modules and about the position of the second module in relation to the first module are performed via 4G, 5G, V2I, Wi-Fi, Bluetooth or any other wireless communication means. The modules may communicate directly with each other via 4G, 5G, V2I (Vehicle to Infrastructure), Wi-Fi, Bluetooth or any other wireless communication means. Thus, transmitting information about the identified area between the two modules and about the position of the second module in relation to the first module for the physically connecting of the modules may be performed directly and symbiotically between the modules without instructions from an off-board center. Alternatively, or in combination with the directly communication between the modules, information about the identified area between the two modules and about the position of the second module in relation to the first module may be transmitted via an off-board center, such as a control center.

The step of physically connecting the modules when the second module has reached the first module is performed by a mechanical interface.

The drive module and the functional module each suitably comprises at least one physical interface for the purpose of physically connecting the modules. Such physical interfaces may be configured in different ways, and may for example comprise coupling units adapted to engage, quick couplings, hooks, cooperating protrusions and recesses or similar. The drive module may comprise a physical interface for connection with a functional module on at least two different sides of the drive module. This way, the drive module can be connected to a functional module in various ways and the flexibility is increased.

The step of receiving information from the first module about an identified area between the two modules also comprises receiving the information from a control center arranged in communication with the modules.

The control center or an off-board system may comprise a control device, referred to as a third control device. The first, second and third control devices are adapted to communicate with each other or together as a network. The third control device may be adapted to receive the information about the identified area. In order to prepare for physically connection of the modules and for achieving redundancy the second control device in the second module may receive information about the identified area between the modules from the third control device at the control center.

The step of continuously receiving information from the first module about the position of the second module in relation to the first module and controlling the second module based on this information also comprises receiving information from a control center arranged in communication with the modules.

The third control device at the control center may be adapted to receive information about the position of the second module in order to prepare for physically connection of the modules. The third control device may be adapted to receive the information about the position of the second module. In order to prepare for physically connection of the modules and for achieving redundancy the second control device in the second module may receive information about the position of the second module from the third control device at the control center.

The method may further comprise receiving information from the control center, the information indicating which module of the vehicle to operate as a master and which module to operate as a slave.

The control center may appoint which module to operate as a master and which to operate as slave(s) when assembling the vehicle. When the control device is comprised in a module operating as a master, the control device may be configured to transmit control signals to the various systems and components of the modules of the vehicle for controlling for example the steering and the propulsion of the vehicle. The control device may thereby be adapted to operate the modules autonomously based on received commands, e.g. from the control center, and based on sensor input regarding its surroundings and positioning. The control device is in that case adapted to receive commands from a remotely located control center and to convert the command into control signals for controlling the various systems and components of the modules.

The present disclosure also relates to a computer program comprising instructions which, when the program is executed by a computer, cause the computer to carry out the method relating to the second control device. The invention also relates to a computer-readable medium comprising instructions, which when executed by a computer, cause the computer to carry out the method relating to the second control device.

The present disclosure also relates to a second control device for controlling physically connecting a first and a second module to assemble a vehicle is provided, the vehicle being assembled from a set of modules comprising: at least one drive module; and at least one functional module, wherein the at least one drive module comprises a pair of wheels and is configured to be autonomously operated and drive the assembled vehicle, and wherein the second control device is comprised in a second module of the two modules, the second control device being configured to: receive information from the first module about an identified area between the two modules; control the second module towards the first module based on the received information about the area between the two modules; continuously receive information from the first module about the position of the second module in relation to the first module and control the second module based on this information; and physically connect the modules when the second module has reached the first module.

It will be appreciated that all the embodiments described for this method aspect of the invention are also applicable to the second control device aspect of the invention. That is, the second control device may be configured to perform any one of the steps of the method performed by the second control device according to the various embodiments described above.

The second module comprises the second control device and the second control device may be configured to control the operation of the second module based on received information from the first module about the identified area between the two modules and the continuously received information about the position of the second module in relation to the first module. The second control device may thus be configured to transmit control signals to the various systems and components of the second module for controlling for example the steering and the propulsion of the second module. The second control device may be adapted to operate the second module autonomously based on received commands, e.g. from the first control device, and based on sensor input regarding its surroundings and positioning. The second control device may also be adapted to receive commands from a remotely located control device at a control center, and to convert the command into control signals for controlling the various systems and components of the drive module. The second control device may be configured to receive data about the surroundings from various sensor devices, and based on this data control the drive module. The second control device may also be adapted to communicate with traffic systems of various kinds. The second control device may thereby be able to determine the status of a traffic light, determine if an accident has occurred and based on that determine a new route for the vehicle, or itself if not connected to a functional module, etc. The second control device may be adapted to communicate directly with such traffic systems or it may be adapted to communicate with such traffic systems via the first control device. The second control device may be implemented as a separate entity or distributed in two or more physical entities. The second control device may comprise one or more computers. The second control device may thus be implemented or realized by the second control device comprising a processor and a memory, the memory comprising instructions, which when executed by the processor causes the first control device to perform the herein disclosed method.

According to an example, the second control device may be configured to receive information from the first module about an identified area between the two modules and about the position of the second module in relation to the first module via 4G, 5G, V2I, Wi-Fi, Bluetooth or any other wireless communication means.

Information about the identified area between the two modules and about the position of the second module in relation to the first module are transmitted directly and symbiotically between the modules without instructions from an off-board center, such as a control center. Instead, the second control device is configured to wireless receive information about the identified area and about the position of the second module in relation to the first module directly from the first module. The information about the identified area and about the position of the second module in relation to the first module are received by the second control device in the second module. Alternatively, or in combination with the directly communication between the modules, the second control device may be configured to receive the information about the identified area between the two modules and about the position of the second module in relation to the first module from the first control device via the control center.

According to an example, the second control device may be configured to physically connect the modules by a mechanical interface when the second module has reached the first module.

The drive module and the functional module each suitably comprises at least one physical interface for the purpose of physically connecting the modules. Such physical interfaces may be configured in different ways, and may for example comprise coupling units adapted to engage, quick couplings, hooks, cooperating protrusions and recesses or similar. The drive module may comprise a physical interface for connection with a functional module on at least two different sides of the drive module. This way, the drive module can be connected to a functional module in various ways and the flexibility is increased. The physical interfaces of the drive module are adapted for connection with a functional module and/or another drive module. The second control device may be configured to control the mechanical interface in order to connect the two modules physically when the second module has reached the first module. The second control device may be configured to control the mechanical interfaces on both modules in order to connect the two modules physically when the second module has reached the first module. The second control device may be configured to instruct the first control device in the first module to connect the two modules physically when the second module has reached the first module. The second control device may be configured to be instructed by the first control device in the first module to connect the two modules physically when the second module has reached the first module.

The present disclosure also relates to a vehicle, being assembled from a set of modules is provided, comprising: at least one drive module and; at least one functional module, wherein the at least one drive module comprises a pair of wheels and is configured to be autonomously operated and drive the assembled vehicle, the vehicle comprising: a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

When the vehicle has been assembled, the control center may command the assembled vehicle to perform a mission/function. The mission/function may be communicated to the first and/or the second control device in the modules, which automatically controls the assembled vehicle to perform the function/mission. According to an example, there is a handshake between the assembled vehicle and the control center when the assembled vehicle has received the function/mission to be performed. The handshake may be between the first and/or the second control device in the modules and the third control device at the control center. When the assembled vehicle has performed its mission, the vehicle may be disassembled and the modules can be used to assemble a new vehicle for a new function or mission. Disassembly of the vehicle is suitably performed similarly to the assembly, by sending commands from the control center to the first and/or the second control device in the modules, which executes the commands autonomously/automatically.

The present disclosure also relates to a system for controlling physically connecting two modules of a vehicle is provided, the vehicle being assembled from a set of modules comprising at least one drive module and; at least one functional module, wherein the at least one drive module comprises a pair of wheels and is configured to be autonomously operated and drive the assembled vehicle, the system comprising: a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

The system for controlling the physically connection of two modules of the vehicle comprises a first control device and a second control device. The first control device may be arranged in the first module. The second control device may be arranged in the second module. The first control device is configured to activate the sensor device. The sensor device is configured to identify the area between the two modules during the process of physically connecting the modules. In the identified area obstacles may be present, which may obstruct the process of physically connecting the modules. The sensor device may therefore identify any obstacle that may be present between the modules. The sensor device is also configured to continuously determine the position of the second module in relation to the first module. The position of the first module has already been determined by means of a detector device, such as a GPS detector. Since the position of the first module is determine it is also possible to continuously determine the position of the second module in relation to the first module by means of the sensor device. The sensor device may thus comprise a proximity sensor for detecting and registering the distance to objects, such as vehicles, pedestrians and buildings. The sensor device may be arranged at the first module. The first control device is configured to transmit information about the identified area to the second control device in the second module. The first control device is also configured to transmit information about the determined position to the second module to the second control device in the second module. The second control device is configured to receive information about the identified area between the two modules from the first control device in the first module. The second control device is also configured to continuously receive information, from the first control device in the first module, about the determined position of the second module in relation to the first module. The second control device is configured to control the second module based on the received information about the identified area between the two modules and the received information about the determined position of the second module in relation to the first module.

The first control device is configured to connect the modules when the second module has reached the first module. Alternatively, the second control device is configured to connect the modules when the second module has reached the first module. Alternatively, the first control device may together with the second control device be configured to connect the modules when the second module has reached the first module. The modules each comprises at least one physical interface for the purpose of physically connecting the modules. The first and second control devices are configured to control the physical interfaces for the purpose of physically connecting the modules.

The first module may be configured as the functional module. The first control device may thus be arranged in the functional module. The second module may thus be configured as the drive module. The control center may comprise a third control device. The first control device and the second control device may wireless transmit information, commands and instructions directly between each other. Thus, this transmitting of information, commands and instructions directly between the first control device and the second control device may be performed directly and symbiotically. However, the first control device and the second control device may wireless transmit information, commands and instructions between each other via the third control device at the control center.

According to an example, the system further comprises a control center arranged in communication with the modules.

The control center may be arranged in communication with the first control device in the first module. The control center may be arranged in communication with the second control device in the second module. The first control device and the second control device may wireless transmit information, commands and instructions between each other via the third control device at the control center. However, the first control device may wireless receive information, commands and instructions from the third control device at the control center. Alternatively, the second control device may wireless receive information, commands and instructions from the third control device at the control center. It may also be possible for both the first control device and the second control device at the same time receive information, commands and instructions from the third control device at the control center.

The present disclosure will now be further illustrated with reference to the appended figures.

FIG. 1 schematically illustrates a first control device 100 for controlling physically connecting a first and a second module 30, 40 to assemble a vehicle 1. The vehicle 1 being assembled from a set of modules 20 comprising at least one drive module 30 and at least one functional module 40. The at least one drive module 30 comprises a pair of wheels 32 and is configured to be autonomously operated and drive the assembled vehicle 1. The first control device 100 is comprised in a first module 30, 40 of the two modules 30, 40. The first control device 100 being configured to activate a sensor device 50 in the first module 30, 40, to identify an area between the two modules 30, 40 by means of the sensor device 50, to transmit information about the identified area to the second module 30, 40, to continuously determine the position of the second module 30, 40 in relation to the first module 30, 40, by means of the sensor device, while the second module 30, 40 is moving towards the first module 30, 40, and transmit the determined position to the second module 30, 40, and to connect the modules 30, 40 when the second module 30, 40 has reached the first module 30, 40. The first control device 100 is configured to transmit information about the identified area and the determined position to the second module 30, 40 via 4G, 5G, V2I, Wi-Fi, Bluetooth or any other wireless communication means. The first control device 100 is configured to physically connecting the modules 30, 40 by a mechanical interface 14 when the second module 30, 40 has reached the first module 30, 40.

The first control device 100 and the second control device 300 may thus be configured to communicate with each other via a link L100. The term "link" refers herein to a communication link which may be a physical connection such as an opto-electronic communication line, or a non-physical connection such as a wireless connection, e.g. a radio link or microwave link and may also comprise 4G, 5G, V2I, Wi-Fi, Bluetooth or any other wireless communication means.

FIG. 1 also schematically illustrates a second control device 300, for controlling physically connecting the first and the second module 30, 40 to assemble the vehicle 1. The second control device 300 is comprised in the second module 30, 40 of the two modules 30, 40. The second control device 300 being configured to receive information from the first module 30, 40 about an identified area between the two modules 30, 40, to control the second module 30, 40 towards the first module 30, 40 based on the received information about the area between the two modules 30, 40, to continuously receive information from the first module 30, 40 about the position of the second module 30, 40 in relation to the first module 30, 40 and control the second module 30, 40 based on this information, and to physically connect the modules 30, 40 when the second module 30, 40 has reached the first module 30, 40. The second control device 300 is configured to receive information from the first module 30, 40 about an identified area between the two modules 30, 40 and about the position of the second module 30, 40 in relation to the first module 30, 40 via 4G, 5G, V2I, Wi-Fi, Bluetooth or any other wireless communication means. The second control device 300 is configured to physically connect the modules 30, 40 by a mechanical interface 14 when the second module 30, 40 has reached the first module 30, 40.

Figure 2:
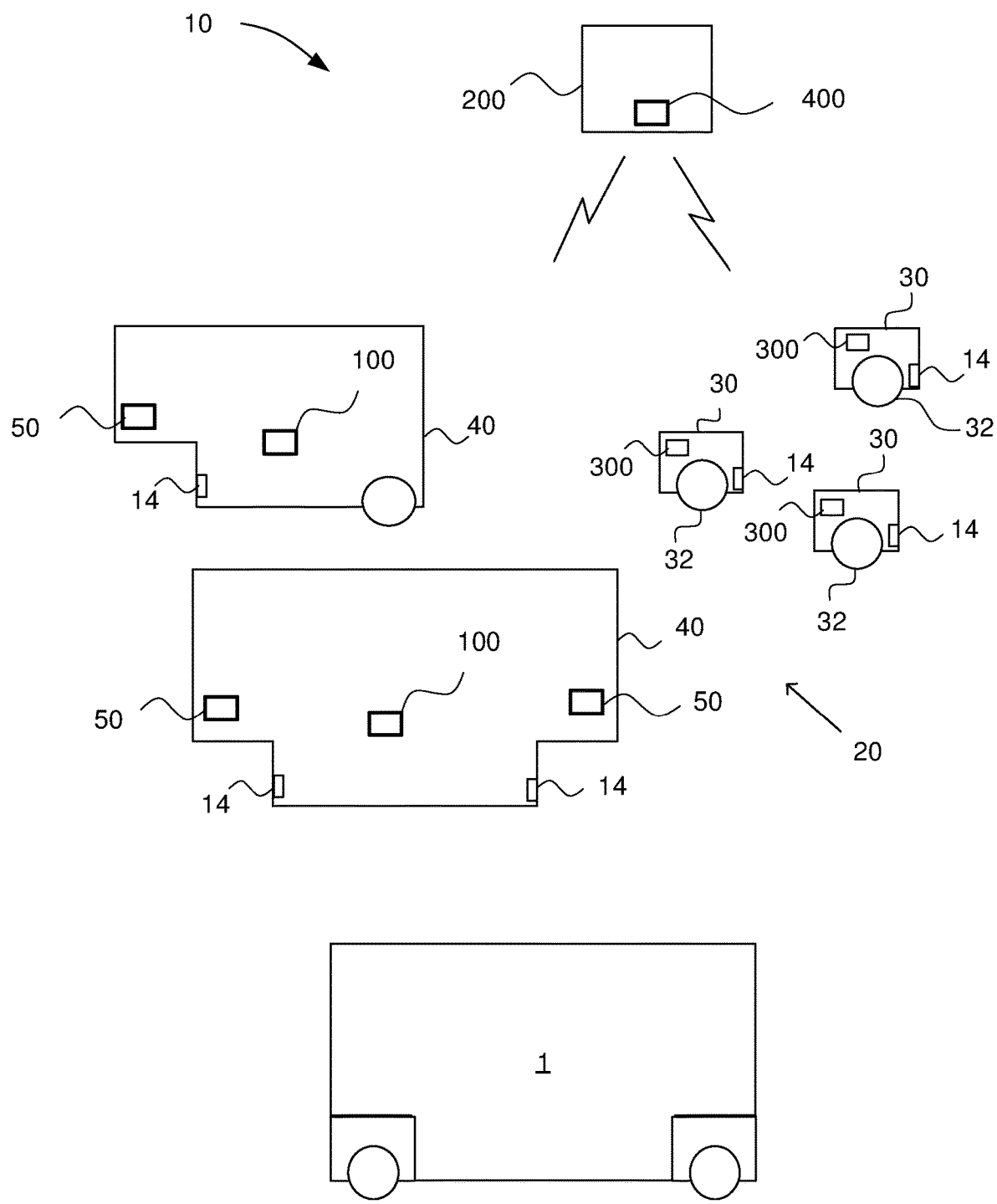
FIG. 2 schematically shows an example of an application of a system for controlling physically connecting two modules of a vehicle according to an embodiment.

FIG. 2 schematically shows an example of an application of a system 10 for controlling physically connecting two modules 30, 40 of a vehicle 1. The vehicle 1 being assembled from a set of modules 20 comprising at least one drive module 30 and at least one functional module 40. The at least one drive module 30 comprises a pair of wheels 32 and is configured to be autonomously operated and drive the assembled vehicle 1, the system 10 comprising the abovementioned first and second control devices 100, 300. The system 10 further comprises a control center 200 arranged in communication with the modules 30, 40. The control center 200 may comprise a third control unit 400, which may be in communication with the modules 30, 40.

Figure 3A:
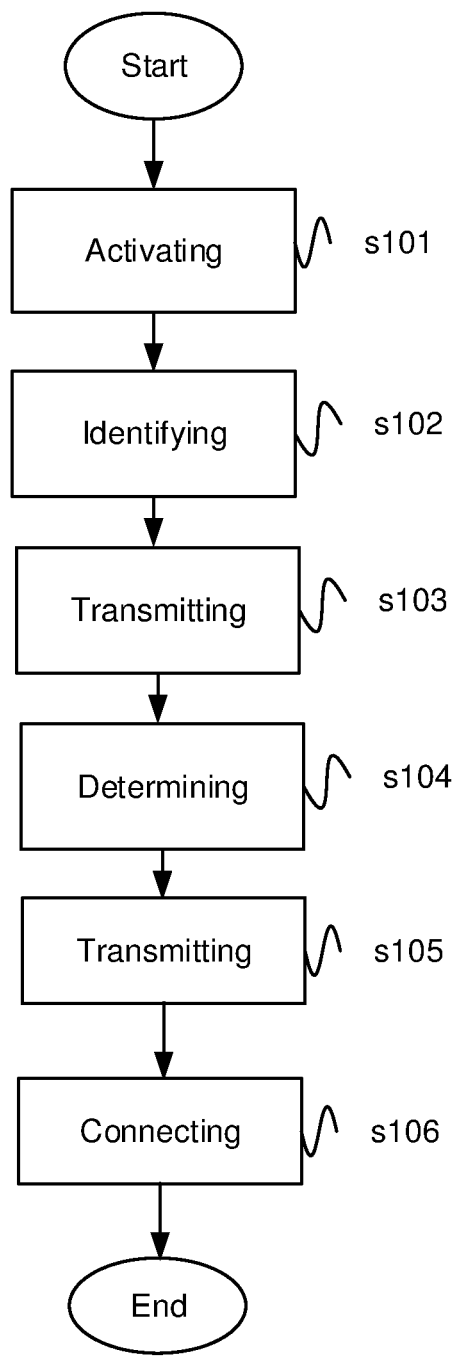
FIG. 3a-b illustrates flow charts for a method performed by a first control device for controlling physically connecting a first and a second module to assemble a vehicle according to an embodiment.

FIG. 3a illustrates a flow chart for a method performed by a first control device 100 for controlling physically connecting a first and a second module 30, 40 to assemble a vehicle 1 according to an embodiment. The method thus relates to the first control device 100 as disclosed in FIG. 1 and the first and second module 30, 40 as disclosed in FIG. 2. The first and second module 30, 40 thus comprises at least one drive module 30 and at least one functional module 40. The method comprises activating s101 a sensor device 50 in the first module 30, 40; identifying s102 an area between the two modules 30, 40 by means of the sensor device 50; transmitting s103 information about the identified area to the second module 30, 40; continuously determining s104 the position of the second module 30, 40 in relation to the first module 30, 40, by means of the sensor device 50, while the second module 30, 40 is moving towards the first module 30, 40, and transmitting s105 the determined position to the second module 30, 40; and physically connecting s106 the modules 30, 40 when the second module 30, 40 has reached the first module 30, 40.

Figure 3B:
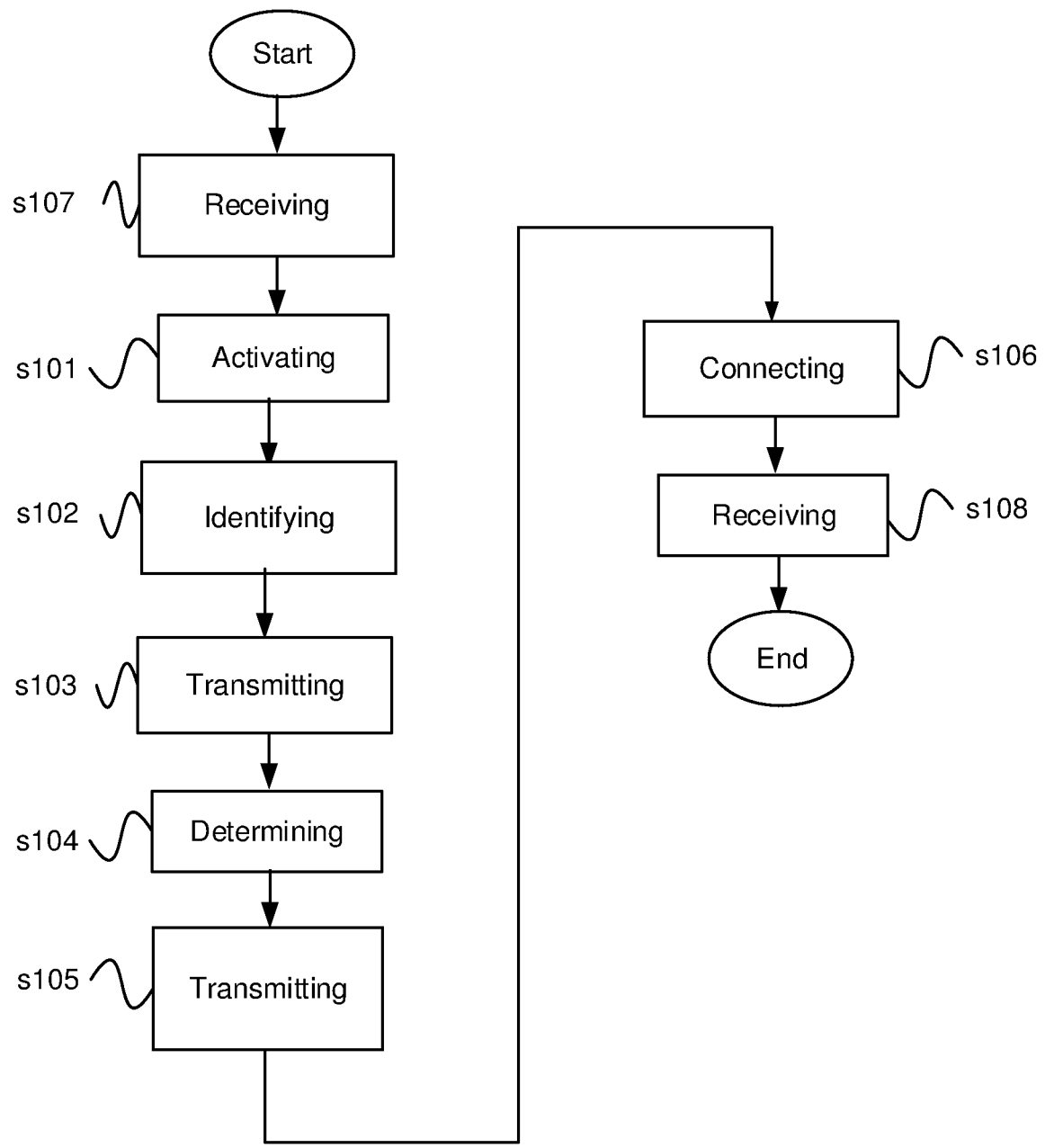

FIG. 3b illustrates a flow chart for a method performed by a first control device 100 for controlling assembly of a vehicle 1 from a set of modules 20 according to an embodiment. The method thus relates to the first control device 100 as disclosed in FIG. 1 and the set of modules 20 as disclosed in FIG. 2. The method comprises activating s101 a sensor device 50 in the first module 30, 40; identifying s102 an area between the two modules 30, 40 by means of the sensor device 50; transmitting s103 information about the identified area to the second module 30, 40; continuously determining s104 the position of the second module 30, 40 in relation to the first module 30, 40, by means of the sensor device 50, while the second module 30, 40 is moving towards the first module 30, 40, and transmitting s105 the determined position to the second module 30, 40; physically connecting s106 the modules 30, 40 when the second module 30, 40 has reached the first module 30, 40; and receiving s108 information from a control center 200, the information indicating which module 30, 40 of the vehicle 1 to operate as a master and which module 30, 40 to operate as a slave. The method steps may be performed sequentially in the order of appearance.

Transmitting s103 information about the identified area to the second module 30, 40 and transmitting s105 the determined position to the second module 30, 40 may be performed via 4G, 5G, V2I, Wi-Fi, Bluetooth or any other wireless communication means.

Physically connecting s106 the modules 30, 40 when the second module 30, 40 has reached the first module 30, 40 may be performed by a mechanical interface 14.

Transmitting s103 information about the identified area to the second module 30, 40 may also comprise transmitting s103 the information to a control center 200 arranged in communication with the modules 30, 40.

Transmitting s106 information about the position of the second module 30, 40 may also comprise transmitting s106 the information to a control center 200 arranged in communication with the modules 30, 40.

Activation s101 of a sensor device 50 may be performed in response to receiving s107 an instruction from a control center 200 arranged in communication with the modules 30, 40.

Figure 4A:
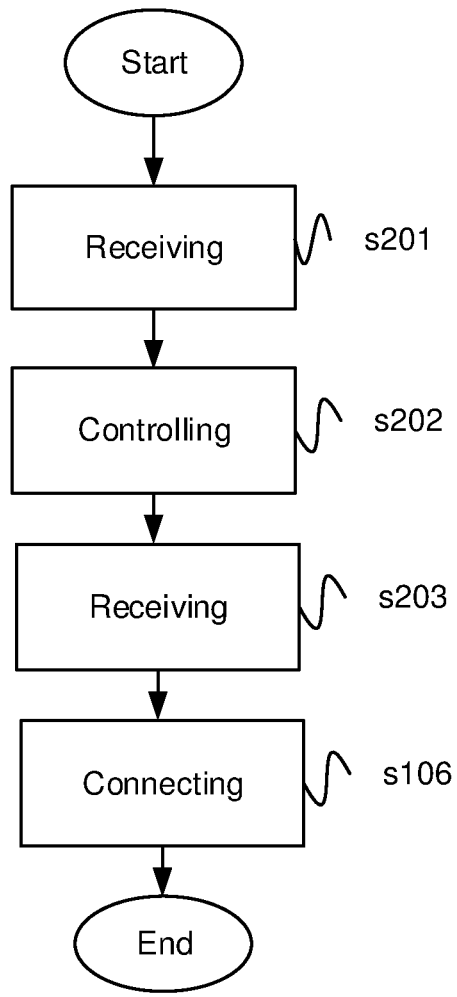
FIG. 4a-b illustrates flow charts for a method performed by a second control device for controlling physically connecting a first and a second module to assemble a vehicle according to an embodiment.

FIG. 4a illustrates a flow chart for a method performed by a second control 200 device for controlling physically connecting a first and a second module 30, 40 to assemble a vehicle 1 according to an embodiment. The method thus relates to the second control device 200 as disclosed in FIG. 1 and the first and second module 30, 40 as disclosed in FIG. 2. The first and second module 30, 40 thus comprises at least one drive module 30 and at least one functional module 40. The method comprises receiving s201 information from the first module 30, 40 about an identified area between the two modules 30, 40; controlling s202 the second module 30, 40 towards the first module 30, 40 based on the received information about the area between the two modules 30, 40; continuously receiving s203 information from the first module 30, 40 about the position of the second module 30, 40 in relation to the first module 30, 40 and controlling s202 the second module 30, 40 based on this information; and physically connecting s106 the modules 30, 40 when the second module 30, 40 has reached the first module 30, 40.

Figure 4B:
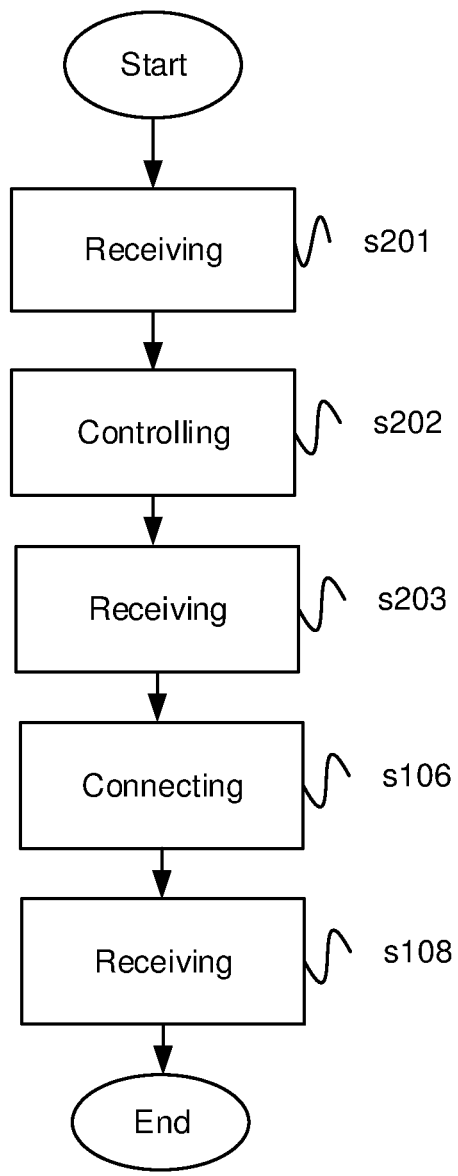

FIG. 4b illustrates a flow chart for a method performed by a second control 200 device for controlling physically connecting a first and a second module 30, 40 to assemble a vehicle 1 according to an embodiment. The method thus relates to the second control device 200 as disclosed in FIG. 1 and the first and second module 30, 40 as disclosed in FIG. 2. The first and second module 30, 40 thus comprises at least one drive module 30 and at least one functional module 40. The method comprises receiving s201 information from the first module 30, 40 about an identified area between the two modules 30, 40; controlling s202 the second module 30, 40 towards the first module 30, 40 based on the received information about the area between the two modules 30, 40; continuously receiving s203 information from the first module 30, 40 about the position of the second module 30, 40 in relation to the first module 30, 40 and controlling s202 the second module 30, 40 based on this information; physically connecting s106 the modules 30, 40 when the second module 30, 40 has reached the first module 30, 40; and receiving s108 information from a control center 200, the information indicating which module 30, 40 of the vehicle 1 to operate as a master and which module 30, 40 to operate as a slave.

Receiving s201 information from the first module 30, 40 about an identified area between the two modules 30, 40 and about the position of the second module 30, 40 in relation to the first module 30, 40 may be performed via 4G, 5G, V2I, Wi-Fi, Bluetooth or any other wireless communication means.

Physically connecting s106 the modules 30, 40 when the second module 30, 40 has reached the first module 30, 40 may be performed by a mechanical interface 14.

Receiving s201 information from the first module 30, 40 about an identified area between the two modules 30, 40 may also comprise receiving s201 the information from a control center 200 arranged in communication with the modules 30, 40.

Continuously receiving s203 information from the first module 30, 40 about the position of the second module 30, 40 in relation to the first module 30, 40 and controlling the second module 30, 40 based on this information may also comprise receiving s203 information from a control center 200 arranged in communication with the modules 30, 40.

Figure 5:
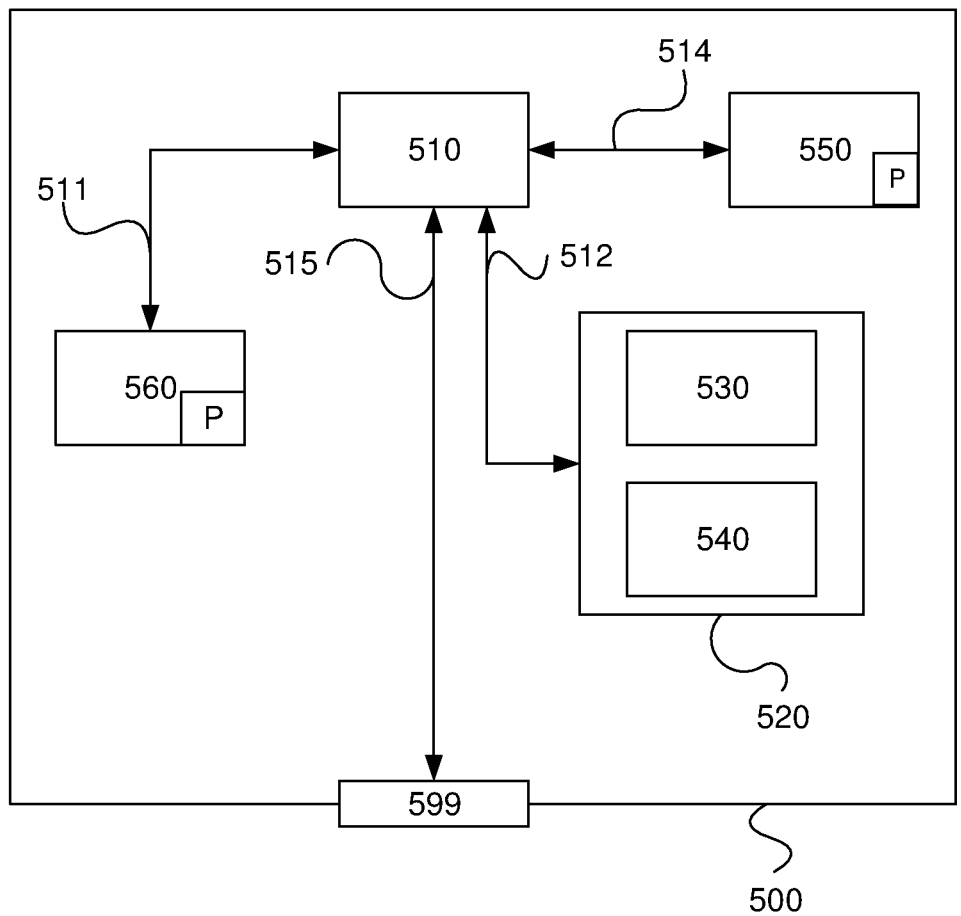
FIG. 5 schematically illustrates a control device or computer according to an embodiment.

FIG. 5 is a diagram of a version of a device 500. The first control device 100 and/or the second control device 200 described with reference to FIG. 1 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises routines for controlling assembly of a vehicle from a set of modules. The programme P may be stored in an executable form or in a compressed form in a memory 560 and/or in a read/write memory 550.

Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a first control device, for controlling physically connecting a first and a second module to assemble a vehicle, the vehicle being assembled from a set of modules comprising:
   at least one drive module; and
   at least one functional module, wherein the at least one drive module comprises a pair of wheels and is configured to be autonomously operated and drive the assembled vehicle, wherein the first control device is comprised in the first module, the method comprising:
   activating a sensor device in the first module;
   identifying an area between the two modules by means of the sensor device;
   transmitting information about the identified area to the second module;
   continuously determining the position of the second module in relation to the first module, by means of the sensor device, while the second module is moving towards the first module, and transmitting the determined position to the second module; and
   physically connecting the modules when the second module has reached the first module.

2. The method according to claim 1, wherein transmitting information about the identified area to the second module and transmitting the determined position to the second module are performed via wireless communication.

3. The method according to claim 1, wherein physically connecting the modules when the second module has reached the first module is performed by a mechanical interface.

4. The method according to claim 1, wherein transmitting information about the identified area to the second module also comprises transmitting the information to a control center arranged in communication with the modules.

5. The method according to claim 1, wherein transmitting information about the position of the second module also comprises transmitting the information to a control center arranged in communication with the modules.

6. The method according to claim 1, wherein the activation of a sensor device is performed in response to receiving an instruction from a control center arranged in communication with the modules.

7. The method according to claim 1, further comprising:
   receiving information from a control center, the information indicating which module of the vehicle to operate as a master and which module to operate as a slave.

8. A computer program product comprising computer program code stored on a non-transitory computer-readable medium, said computer program product used for controlling physically connecting a first and a second module to assemble a vehicle, the vehicle being assembled from a set of modules comprising: at least one drive module and at least one functional module, wherein the at least one drive module comprises a pair of wheels and is configured to be autonomously operated and drive the assembled vehicle, wherein the first control device is comprised in the first module, said computer program code comprising computer instructions to cause one or more control devices to perform the following operations:
   activating a sensor device in the first module;
   identifying an area between the two modules by means of the sensor device;
   transmitting information about the identified area to the second module;
   continuously determining the position of the second module in relation to the first module, by means of the sensor device, while the second module is moving towards the first module, and transmitting the determined position to the second module; and
   physically connecting the modules when the second module has reached the first module.

9. A first control device for controlling physically connecting a first and a second module to assemble a vehicle, the vehicle being assembled from a set of modules comprising:
   at least one drive module; and
   at least one functional module, wherein the at least one drive module comprises a pair of wheels and is configured to be autonomously operated and drive the assembled vehicle, and wherein the first control device is comprised in a first module of the two modules, the first control device being configured to:
   activate a sensor device in the first module;
   identify an area between the two modules by means of the sensor device;
   transmit information about the identified area to the second module;
   continuously determine the position of the second module (30, 40) in relation to the first module, by means of the sensor device, while the second module is moving towards the first module, and transmit the determined position to the second module; and connect the modules when the second module (30, 40) has reached the first module.

10. The first control device according to claim 9, wherein the first control device is configured to transmit information about the identified area and the determined position to the second module via wireless communication.

11. The first control device according to claim 9, wherein the first control device is configured to physically connecting the modules by a mechanical interface when the second module has reached the first module.

12. A method, performed by a second control device, for controlling physically connecting a first and a second module to assemble a vehicle, the vehicle being assembled from a set of modules comprising:
  at least one drive module; and
  at least one functional module, wherein the at least one drive module comprises a pair of wheels and is configured to be autonomously operated and drive the assembled vehicle, wherein the second control device is comprised in the second module, the method comprising:
    receiving information from the first module about an identified area between the two modules;
    controlling the second module towards the first module based on the received information about the area between the two modules;
    continuously receiving information from the first module about the position of the second module in relation to the first module and controlling the second module based on this information; and
    physically connecting the modules when the second module has reached the first module.

13. The method according to claim 12, wherein receiving information from the first module about an identified area between the two modules and about the position of the second module in relation to the first module are performed via wireless communication.

14. The method according to claim 12, wherein physically connecting the modules when the second module has reached the first module is performed by a mechanical interface.

15. The method according to claim 12, wherein receiving information from the first module about an identified area between the two modules also comprises receiving the information from a control center arranged in communication with the modules.

16. The method according to claim 12, wherein continuously receiving information from the first module about the position of the second module in relation to the first module and controlling the second module based on this information also comprises receiving information from a control center arranged in communication with the modules.

17. The method according to claim 12, further comprising:
  receiving information from a control central, the information indicating which module of the vehicle to operate as a master and which module to operate as a slave.

18. A computer program product comprising computer program code stored on a non-transitory computer-readable medium, said computer program product used for controlling physically connecting a first and a second module to assemble a vehicle, the vehicle being assembled from a set of modules comprising: at least one drive module; and at least one functional module, wherein the at least one drive module comprises a pair of wheels and is configured to be autonomously operated and drive the assembled vehicle, wherein the second control device is comprised in the second module, said computer program code comprising computer instructions to cause one or more control devices to perform the following operations:
  receive information from the first module about an identified area between the two modules;
  control the second module towards the first module based on the received information about the area between the two modules;
  continuously receive information from the first module about the position of the second module in relation to the first module and controlling the second module based on this information; and
  physically connect the modules when the second module has reached the first module.

19. A second control device, for controlling physically connecting a first and a second module to assemble a vehicle, the vehicle being assembled from a set of modules comprising:
  at least one drive module; and
  at least one functional module, wherein the at least one drive module comprises a pair of wheels and is configured to be autonomously operated and drive the assembled vehicle, and wherein the second control device is comprised in a second module of the two modules, the second control device being configured to:
    receive information from the first module about an identified area between the two modules;
    control the second module towards the first module (30, 40) based on the received information about the area between the two modules;
    continuously receive information from the first module about the position of the second module in relation to the first module and control the second module based on this information; and
    physically connect the modules when the second module has reached the first module.

20. The second control device according to claim 19, wherein the second control device is configured to receive information from the first module, about an identified area between the two modules and about the position of the second module in relation to the first module via wireless communication.

21. The second control device according to claim 19, wherein the second control device is configured to physically connect the modules by a mechanical interface when the second module has reached the first module.

22. A vehicle, being assembled from a set of modules comprising:
  at least one drive module and;
  at least one functional module, wherein the at least one drive module comprises a pair of wheels and is configured to be autonomously operated and drive the assembled vehicle, the vehicle comprising:
    a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

23. A system for controlling physically connecting two modules of a vehicle, the vehicle being assembled from a set of modules comprising:
- at least one drive module and;
- at least one functional module, wherein the at least one drive module comprises a pair of wheels and is configured to be autonomously operated and drive the assembled vehicle, the system comprising:
  - a first control device configured to activate a sensor device in the first module; identify an area between the two modules by means of the sensor device; transmit information about the identified area to the second module; continuously determine the position of the second module in relation to the first module, by means of the sensor device, while the second module is moving towards the first module, and transmit the determined position to the second module; connect the modules when the second module has reached the first module; and
  - a second control device configured to receive information from the first module about an identified area between the two modules; control the second module towards the first module based on the received information about the area between the two modules; continuously receive information from the first module about the position of the second module in relation to the first module and control the second module based on this information; physically connect the modules when the second module has reached the first module.

24. A system according to claim 23, wherein the system further comprises a control center arranged in communication with the modules.

* * * * *